United States Patent
Twogood et al.

[11] 3,839,093
[45] Oct. 1, 1974

[54] LEAD SEALED-THROUGH CONNECTION

[75] Inventors: Claude E. Twogood, Denver; Donald H. McClelland, Littleton; Toshio Uba, Denver, all of Colo.

[73] Assignee: The Gates Rubber Company, Denver, Colo.

[22] Filed: Sept. 25, 1972

[21] Appl. No.: 292,223

[52] U.S. Cl.................. 136/135 R, 85/77, 136/168
[51] Int. Cl. ............................................. H01m 1/02
[58] Field of Search............. 136/168, 135 R; 85/63, 85/77, 80, 67, 70

[56] References Cited
UNITED STATES PATENTS

| | | | |
|---|---|---|---|
| 1,193,358 | 8/1916 | Carpenter........................... | 136/168 |
| 1,484,306 | 2/1924 | MacKenzie......................... | 136/168 |
| 1,484,481 | 2/1924 | Dunbar................................ | 136/168 |
| 1,843,109 | 2/1932 | Calliflower.......................... | 136/168 |
| 3,704,173 | 11/1972 | McClelland et al. ................ | 136/168 |

Primary Examiner—Donald L. Walton
Attorney, Agent, or Firm—Curtis H. Castleman, Jr.; Raymond Fink; H. W. Oberg, Jr.

[57] ABSTRACT

An electrochemical device having a resilient, electrolyte resistant inner lining and top (e.g., of plastic) and connections between the electrodes of the device through the inner top to the device terminals which are sealed by a compression fit between the terminal connecting post and resilient inner top. A hole or port in the resilient member at the point of connection carries the terminal connecting post which consists of a deformable electrical conductor of relatively soft lead. This deformable lead post is made to yield and expand against the plastic lining to form a liquid seal compression fit. The expansion is provided by the engagement of a threaded male member, e.g., a bolt, with a threaded female member, e.g., a lock nut, one of the members being embedded in the lead post and reacting against and deforming the lead upon engagement of the threaded members. This seal has particularly utility in a sealed or resealably safety valved battery and other electrolytic cells.

16 Claims, 5 Drawing Figures

LEAD SEALED-THROUGH CONNECTION

CROSS REFERENCES TO RELATED APPLICATIONS

This application is related to copending U.S. Pat. application Ser. No. 90,178, filed Oct. 7, 1970, now U.S. Pat. No. 3,704,173.

BACKGROUND OF THE INVENTION

This invention relates to an internal seal for an electrolytic device such as a sealed battery cell capable of omnipositional use and storage.

One of the basic problems in electrolytic manufacture and use is leakage of electrolyte through the cell package. This is particularly true in battery cells which are of the so called sealed variety in which the cell may be used in any desired position. While the problem of leakage has been more or less solved in the case of primary cells, secondary cells of the type exemplified by lead-acid present unique engineering design problems for overcoming leakage. Because of the repeated charge/ discharge cycles, varying attitude and long use to which these secondary cells are put, more reliable sealing means are required to prevent electrolyte leakage than in customary dry cells and non-maintenance-free cells, as typified by the automobile storage battery.

This leakage problem is particularly significant in the maintenance-free lead-acid battery. The sulfuric acid electrolyte employed in these batteries is particularly corrosive so it has been customary to envelop the cell pack with an acid resistant lining. However, leakage around the lead post connections through the lining top has been prevalent, particularly due to high wettability of the lead by acid electrolyte. Normal sealants or cements used in lead-acid storage batteries are generally inadequate for use in maintenance-free lead-acid batteries for at least the following reasons: first, the acid electrolyte tends to attack the interface between the lead terminal and its immediately contiguous oxide layer, thus bypassing and avoiding the sealant which is merely in contact with the lead oxide coating, allowing leakage; and secondly, it is very difficult, if not impossible, to obtain an adhesive which bonds both lead and a resilient material such as plastic, and additionally be acid resistant.

While the related sealing device disclosed in the aforementioned U.S. Pat. No. 3,704,173 has been proved to be a very effective sealed-through connection for relatively small size cells, e.g., having 2.5 A.H. capacity, larger cells or even comparable sized cells which are earmarked for extremely high rate use require larger connections to handle the high current flow through the device. For instance, some applications of the cell are designed to draw currents of 100-700 amperes or more on discharge from a single cell thus requiring low impedance terminal connectors.

The prior art is exemplified by U.S. Pat. Nos. 1,193,358 to Carpenter and 2,862,039 to Ensign, et al.

It is a primary object of the present invention to overcome disadvantages of the prior art and provide a reliable liquid seal for electrolytic devices.

It is another object to provide a compression fit liquid seal between a deformable lead electrical connector and a resilient material contiguous thereto.

It is another object to provide a sealed terminal connector having very low internal electrical resistance capable of conducting very high current flows.

It is a further object of this invention to provide the sealing means and method therefor requiring a minimum of effort and materials and yet have high reliability.

These and other objects of the invention are met by the present invention which is more particularly described hereinafter.

SUMMARY OF THE INVENTION

Briefly described, the invention includes a resilient seat member housing a deformable electrically conductive relatively soft lead connector (e.g., a lead post) in intimate compressive contact produced by expanding or displacing the deformable connector against the resilient seat. The connector is preferably radially and axially upwardly deformed by the engagement of a threaded male member, e.g., a bolt, with a threaded female member, e.g., a lock nut, one of the members being embedded in the lead post connector and reacting against and deforming the lead upon engagement of the threaded members. In the case of a battery, the resilient member (e.g., plastic) forms a barrier to electrolyte and provides means for the electrical communications from the electrodes of the battery eventually to the battery terminals for use. The sealing configuration of the present invention has particular utility in a maintenance-free lead-acid cell in which the resilient member forms an inner top which is acid resistant and prevents external leakage particularly to outer metallic parts of the cell susceptible to corrosion.

BRIEF DESCRIPTION OF THE DRAWINGS

The invention will be better understood by reference to the accompanying drawings, in which.

PREFERRED EMBODIMENTS OF THE INVENTION

Figure 1:
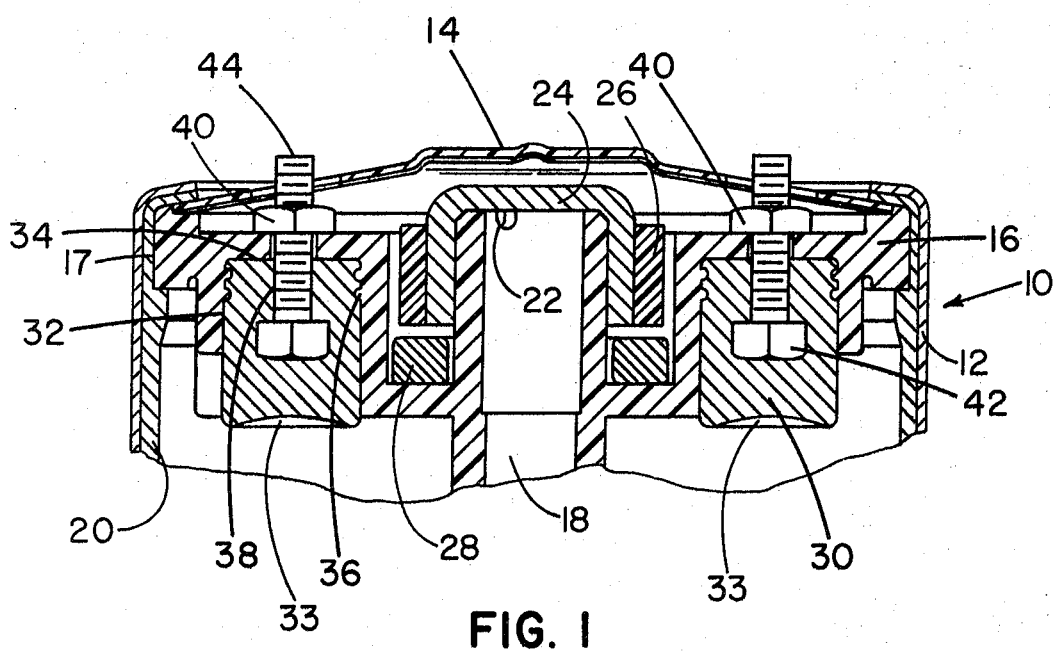
FIG. 1 is a sectional view of the top portion of a sealed battery depicting the novel seal of the present invention in relation to proximate parts of the battery.

This invention is applicable to primary and secondary batteries, fuel cells and the like, which are vented, resealably safety valved or hermetically sealed, but is most preferably adapted to sealed (including safety valved) batteries in which leakage of electrolyte from the electrode pack area to the battery terminals through internal top connections occurs.

The seal of the present invention is between a deformable lead body (e.g., a soft lead post connector) and a resilient member enveloping at least a portion of the surface of the deformable body. The resilient member should be of sufficient rigidity to deform lead upon its displacement and expansion against the resilient member. The material should also be resilient enough to bias the deformable material in a mutually pressure exerting condition. If the material lacks sufficient resiliency, it may tend to "cold flow," i.e., a phenomenon of outward creeping of the resilient member resulting in a relief of pressure and eventual loss of the necessary compression. While a certain amount of cold flow is tolerable, excessive creeping breaks the seal.

The resilient member should also be compatible with the electrolyte of the cell. The resilient member acts as a guide or seat having apertures or ports of a cylindrical or other shape to accommodate the deformable member. Thus, many molded, machined or otherwise fabricated plastics or rubbers are preferred. Examples of useful plastic materials include polypropylene oxide, polysulfone, a variety of polyolefins such as polyethylene and polypropylene, polyurethane, polystyrene, polymers of styrene-butadiene, copolymers of acrylomitrile-butadiene-styrene (ABS), chlorinated polyvinyl chloride, ABS modified polyvinyl chloride, polypropylene modified polyvinyl chloride, a variety of polyesters, acrylics, phenoxy compounds, chlorinated polyethers, phenolic resins, and melamine resins. A number of natural and synthetic rubbers are also useful, exemplified by hard rubbers, thiokol, butyl rubbers and neoprene.

The deformable lead body serves as a connection between the battery pack electrodes and leads on the one hand, and the terminal connections (e.g., battery top and can) on the other hand. Since this deformable member forms a portion of the electrical circuitry of the cell, it preferably is a good electrical conductor. The most highly conductive deformable leads are the high purity leads, preferably of a purity of at least about 99.9 weight percent, and more preferably at least about 99.99 weight percent based on the total metal content of the deformable material. However, lower purity alloys of lead are useful in the present invention if the alloy is relatively soft or deformable. By relatively soft is meant that the alloy under the conditions of use has a Brinell hardness (10 mm./31.2 kg-120 sec.) of preferably less than about 10 kg/mm$^2$, more preferably less than about 8 kg/mm$^2$. For instance, various lead-calcium alloys, e.g., containing 0.07 weight percent or less calcium, and lead-tin alloys containing preferably less than about 10 weight percent tin are generally sufficiently deformable.

The manner in which the alloy is cast is well known to have a significant effect upon the resultant hardness, and thus such factors as pretreatment of the alloy, quenching, air-cooling, storage duration, etc., should be taken into account. Reference is made to *Lead and Lead Alloys*, W. Hofmann, Springer-Verlag, Berlin/Heidelberg, 1970 for selection of particular alloys of lead which satisfy the properties specified according to the present invention. That reference will readily show that typical antimonial lead used for battery connections (containing generally from 6–10 weight percent antimony) has a Brinell hardness which well exceeds 10 kg/mm$^2$ after only a short period of storage.

According to this invention a force is used to expand and hold the deformable body in pressure relation to the resilient seat. The force may be exerted in a radial direction, axial pull, or combinations thereof. Preferably the expansion is provided by the engagement of a threaded male member with a threaded female member, one of such members being embedded in the lead post and having one or more shoulder projections which react against and deform the lead upon engagement of the threaded members. In this manner, and because of the softness of the lead or lead alloy, the soft deformable connector is made to flow preferably axially upwardly (relative to the male member regarded as the axis) and radially outwardly to form the tight compression fit with the resilient biasing seat. An advantage of this arrangement is that the connection may be made solely from the top side of the resilient seat after the seat has been attached to the cell container (i.e., a blind connection), and without the need for any type of stamping or holding fixture beneath the connector.

The threaded male and female members are preferably individually selected from a conductive metal compatible with the deformable lead member with which one or both are in contact. Suitable materials include tin, lead alloys, silver, terne plate, bismuth, zinc, cadmium, nickel, gold, brass, copper or other compatible alloyed or coated material. The threaded member embedded in the deformable lead should have a hardness greater than that of the deformable lead to permit its displacement.

In a preferred aspect of the invention the threaded male and/or female member is relatively soft and carries a uniform coating of a conductive material which is mutually miscible and mobile with respect to both the threaded member(s) and the soft lead with which it is in intimate contact. In this manner the coating material tends to diffuse into the contiguous soft lead and soft threaded members to form a type of cold weld or alloy which greatly increases the adhesive forces between the materials. The resulting bond permits the use of added torque when engaging the threaded members for more complete deformation of the soft lead and a consequential improved seal virtually without risk of pulling out and disengagement of the threaded members from the soft lead connector. A preferred coating material is tin or solder and may be applied either to the lead connector or threaded member in known manner.

The invention will be more particularly understood by reference to the accompany drawings which depict certain preferred but non-exclusive embodiments of the invention. In the several drawings like numerals designate like parts.

In FIG. 1 the upper portion of the maintenance-free lead-acid battery 10 is shown having a metal container 12, outer plastic top 14, and a polypropylene liner 20 bonded along interface 17 to a polypropylene injection molded inner top 16. This inner plastic top is provided with a central vent cylindrical portion 18 and notch 22 for release of excessive gas pressure that may develop in the cell. The rubber safety relief valve 24 tightly fits over the central vent and is compressed inwardly by ring 26 which is optionally employed. The valve automatically reseals upon discharge of the excess pressure. In case any electrolyte escapes through the relief valve means, it may be neutralized by a suitable material such as carbonate pill 28.

The connection through the plastic lid top 16 shown in FIG. 1 includes a deformed lead post connector 30 bearing intimately against the sides 32 and overhang portion 34 of an aperture or port formed in the plastic lid top. A plurality of optional ridges or embossments 36 line the aperture and serve to secure the connector in position during and after engagement of the inverted bolt 38 and nut 40 which are axially aligned in the aperture. The bolt 38 has a head portion 42 imbedded in the connector which serves as a shoulder projection for displacing the lead connector 30 upon engagement of the nut 40 with the upwardly protruding threaded shank 44 of the bolt. The bolt preferably carries a coating of tin or tin alloy for improved adhesion with the contiguous soft lead. The displacement may be considered as an initially axial upward yielding of the lead mass until the lead engages the overhang 34, after which flow occurs generally radially outwardly until the nut becomes relatively tight indicating adequate compression between the resilient top 16 and connector 30. Deformation of the connector also generally creates a slight concavity 33 at its underside. Leads from the connectors 30 to the respective negative and positive electrode tabs of the cell pack below are not shown. The threaded shanks 44 protruding through the plastic outer top 14 serve as the respective opposite polarity terminals of the cell, and may carry additional nuts to facilitate battery connections to a load.

Figure 2:
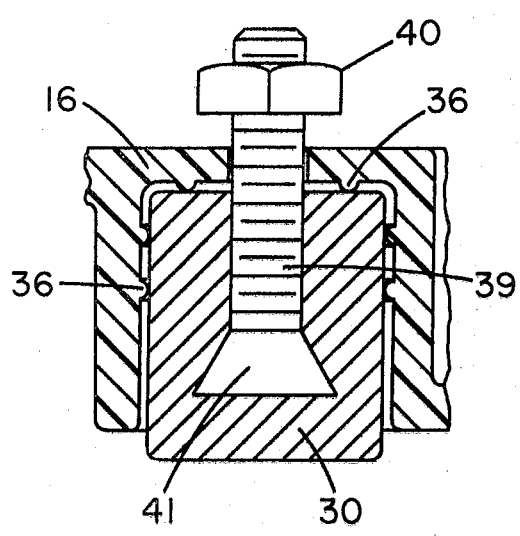
FIG. 2 is an enlarged partial sectional view showing an imbedded tapered inverted bolt and nut prior to engagement shown in FIG. 3.
Figure 3:
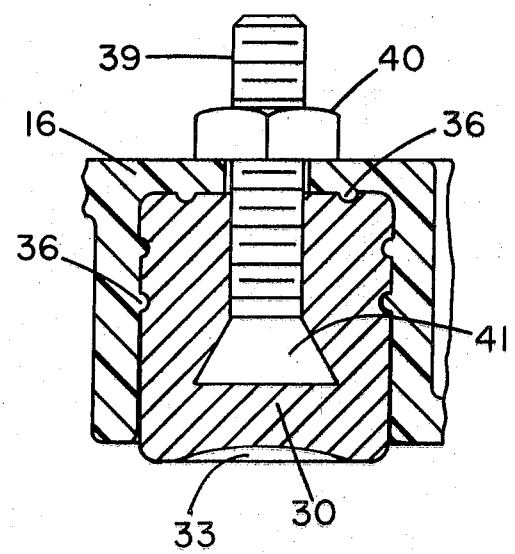

The embodiment illustrated in FIGS. 2 and 3 depict a preferred alternative to the connector of FIG. 1. In this case the tin-coated inverted bolt 39 has a head portion 41 functioning as a shoulder projection which is tapered at an angle such that a normal drawn from the tapered surface is determined by both a radial outward component and an axial upward component. Because of this tapered configuration tightening of the nut 40 draws the lead simultaneously axially upwardly and radially as shown in FIG. 3 producing the seal. It has been found that the employment of these dual force components creats a superior seal which has a lasting effect.

Alternative to the configuration of FIGS. 2 and 3, the tapered head portion 41 can be omitted and replaced by a straight or tapered threaded shank so long as the threads or other upstanding shoulder projection portions on the shank are sufficient to provide significant bearing surfaces to engage and bias the soft lead against the resilient seat member. In this embodiment it is quite beneficial to employ a coating of a mutually miscible material to enhance bonding, as previously discussed, so as to preclude pull-out of the threaded bolt upon application of increasing torque as the nut is tightened. This coated, threaded shank member with or without a tapered head is advantageously pre-cast into the soft lead for intimate engagement and envelopment of the shoulder portions.

Figure 4:
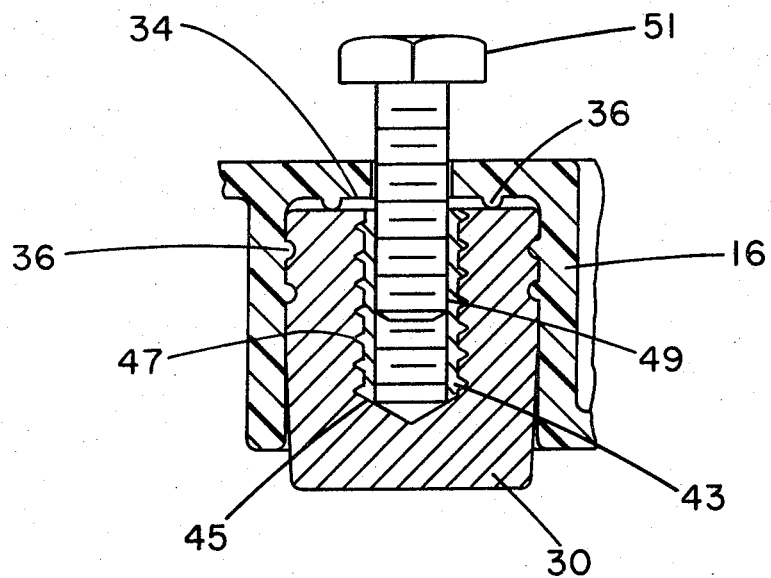
FIGS. 4 and 5 depict in section the use of a double-threaded imbedded insert and cooperating bolt before and after engagement of the bolt, respectively.
Figure 5:
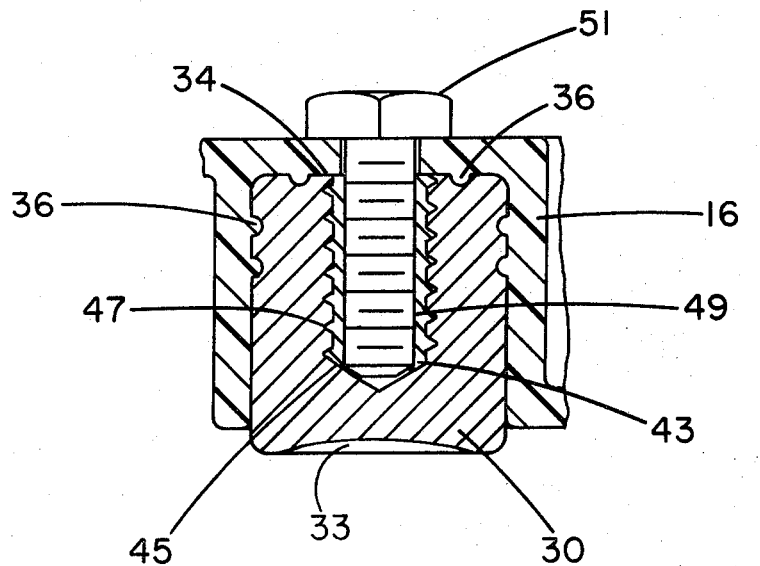

In FIGS. 4 and 5 the female threaded member consists of a double threaded bushing or sleeve insert 43 which is made of a harder material than the lead post 30. Engagement of the insert is facilitated by pre-hollowing the lead post (although not necessary) to form a cored hole of smaller diameter than the insert, then employing a standard tool to drive the insert into the hole while it simultaneously taps its own threads. Chamfering or tapering the leading edges 45 also improves engageability. A positive radial displacement of the lead post is effected so as to bias the lead against the sidewalls of the resilient member 16. As the full diameter threads 47 of the insert become engaged a frictional lock is created. The aforementioned coating may be utilized for improved bonding, although not essential. The internal threads may be standard machine screw threads to permit engagement with standard threaded fasteners such as stud or bolt 51. As the bolt 51 is drawn down, an axial pull induced by each of the external threads or shoulder projections 47 displaces the lead post axially upwardly against the overhang 34 together with ridges 36 to effect the seal.

It will be understood that various types of double threaded inserts, including the holed or slotted self-tapping or non-self-tapping (e.g., cast in place) kind will be useful. The Groov-Pin Corporation of Ridgefield, N.J., and the Newton Insert Company of Los Angeles, Calif., offer a number of commercially available inserts useful with the invention. It will be also noted that the insert 43 may be engaged with lead post 30 prior to positioning the post in the aperture formed in resilient member 16. Sealing would then be effected solely by tightening of bolt 51 causing both an axial and radial deformation of the lead post. Because the external diameter of the insert is quite a bit greater than the internal thread diameter, a significant increased shear area is available permiting use of high strength threaded bolts or other fasteners.

Other types of insert bushings useful with the invention but which do not have threaded exteriors include those offered by the Phelps Division of Helicoil Corporation, Danbury, Conn., e.g., Bulletin P-116. Shoulder projections on the exterior of the bushing may be provided by knurls, embossments, ribs, etc. Further, radial expansion of the insert is enhanced by slotting and inwardly tapering the insert and employing a spreader member actuateable, inner alia, by engagement of the threaded male bolt member. These inserts are commonly employed for fastening plastic and wood materials together.

Sealed connections according to the present invention have been repeatedly tested and found to be substantially leak-proof. One particular advantage of these connections is their low internal electrical resistance, which is generally less than about one milliohm and usually less than one half milliohm. The connectors are also characterized by the capability of conducting currents in the range of 100–700 amps or more for limited time periods.

It should be understood that the invention is capable of a variety of modifications and variations which will be made apparent to those skilled in the art by a reading of the specification and which are to be included within the spirit of the claims appended hereto. For instance, traditional means of obtaining a sealed through metallic conductor connection such as by the use of an O-ring or other elastomeric material between the resilient member and lead deformable body, as well as by the use of a sealant (e.g., tar) in certain instances could be used in addition to the apparatus of the present invention, though not at all necessary. Furthermore, the invention can be thought of as a general method and apparatus for sealing the interface between a resilient member and a deformable lead member, having applications in apparatus other than just battery cells, such as in an hemetically sealed motor, electrodeposition tank and other electrolytic devices.

What is claimed is:

1. A seal for connections between the electrodes and terminals of an electrolytic device comprising:
   a resilient seat member containing apertures for terminal connections therethrough;
   a soft deformable lead or lead alloy connector seated in the apertures of said resilient material, said lead connector having a Brinell hardness of less than about 10 kg/mm$^2$;

a male threaded member; and a female threaded member receivably engaging said male member, one of said threaded members having a Brinell hardness greater than that of the lead connector and having a lateral shoulder or shoulder projections other than the threads embedded in the lead connector, the shoulder projection(s) exerting a positive force against the soft lead which in turn is made to be in tight conformity with the aperture wall of the resilient member to form the liquid tight seal.

2. The seal arrangement of claim 1 wherein the resilient seat member is made of a material selected from the group consisting of polyolefins, polystyrene, polycarbonate, chlorinated polyethers, copolymers of acrylonitrile-butadiene-styrene, polyvinyl chloride, polysulfones, and polyphenylene oxide.

3. The seal arrangement of claim 1 wherein the male threaded member is a bolt, the head of the bolt forming said shoulder and embedded in the lead connector, while the threaded end of the bolt extends upwardly and exteriorly of the lead connector for current collection and engagement with the female threaded member.

4. The seal arrangement of claim 3 wherein the head of the bolt forms a tapered surface, the normal to the surface having axial upward and radial components.

5. The seal arrangement of claim 1 wherein the female threaded member is embedded in the lead connector and the male threaded member is axially engaged therewith and includes a head portion which bears against the resilient seat exterior of the lead connector.

6. The seal arrangement of claim 5 wherein the female member consists of an internally and externally threaded bushing tapped into the lead connector.

7. The seal arrangement of claim 5 wherein the female member has an exterior carrying shoulder projections other than threads.

8. The seal arrangement of claim 1 wherein at least a portion of the male or female threaded member which is embedded in the soft connector bears a coating compatible with the threaded member(s) and connector, said coating forming a bond between the embedded threaded member(s) and the connector to facilitate the use of higher torque when mutually tightening the threaded members.

9. The seal arrangement of claim 8 wherein the coating comprises tin.

10. The seal arrangement of claim 1 as sealed through terminal connections in combination with a lead-acid electrochemical cell.

11. A sealed-through intra-cell connection between the electrodes and outer terminals of a sealed lead-acid electrochemical cell comprising:

a resilient plastic seat containing apertures for terminal connections therethrough, said apertures having side and overhang portions;

a deformable lead or lead alloy connector seated in the apertures of said resilient plastic material, the deformable connector having a Brinell hardness of less than about 10 kg/mm$^2$;

a male member axially disposed in the connector and having embedded in the connector a lateral shoulder portion with a surface inclined with respect to the axis of the connector, the normal to such surface having axial upward and radial components with respect to the upright orientation of the cell; and a female member receivably engaging the male member in a manner urging the shoulder portion of the male member toward the female member, exerting a positive force against the deformable connector which in turn tightly conforms to the side and overhang portions of the plastic seat apertures to form the electrolyte-tight seal.

12. The connection of claim 11 wherein the male member carries a coating of a conductive material which diffuses into and is mutually miscible with the male member and deformable connector to form an adherent joining therebetween.

13. A method for obtaining a liquid tight seal between a resilient container and a deformable soft lead or lead alloy electrical connector extending through and supported by said container, comprising:

embedding a first threaded member having at least one shoulder projection within said lead connector;

axially engaging from above the connector a second threaded member with said first threaded member and tightening until the soft lead has deformed radially and axially upwardly against the resilient seat to form the seal.

14. The method of claim 13 wherein the soft lead connector has a Brinell hardness of less than about 10 kg/mm$^2$, and less than the Brinell hardness of the embedded threaded member.

15. The method of claim 13 wherein the resilient container is made of a polymeric material.

16. The method of claim 13 wherein said embedded threaded member is coated with a material which diffuses into and is mutually miscible with the connector and embedded threaded member.

* * * * *